(12) United States Patent
Yamazaki

(10) Patent No.: US 6,742,077 B1
(45) Date of Patent: May 25, 2004

(54) SYSTEM FOR ACCESSING A MEMORY COMPRISING INTERLEAVED MEMORY MODULES HAVING DIFFERENT CAPACITIES

(75) Inventor: Atsushi Yamazaki, Yamanashi (JP)

(73) Assignee: NEC Corporation, Tokyo (JP)

( * ) Notice: Subject to any disclaimer, the term of this patent is extended or adjusted under 35 U.S.C. 154(b) by 506 days.

(21) Appl. No.: 09/677,588

(22) Filed: Oct. 3, 2000

(30) Foreign Application Priority Data

Oct. 7, 1999 (JP) .......................................... 11/286343

(51) Int. Cl.⁷ .............................................. G06F 12/06
(52) U.S. Cl. ............................ 711/5; 711/105; 711/170
(58) Field of Search ................................. 711/170, 171, 711/172, 100, 5, 111, 105; 714/718

(56) References Cited

U.S. PATENT DOCUMENTS

| 4,908,789 | A | | 3/1990 | Blokkum et al. | |
|---|---|---|---|---|---|
| 5,446,860 | A | * | 8/1995 | Dresser et al. | 711/100 |
| 5,706,407 | A | * | 1/1998 | Nakamura et al. | 711/172 |
| 5,860,134 | A | * | 1/1999 | Cowell | 711/172 |
| 6,092,146 | A | * | 7/2000 | Dell et al. | 711/5 |
| 6,182,253 | B1 | * | 1/2001 | Lawrence et al. | 714/718 |
| 6,446,184 | B2 | * | 9/2002 | Dell et al. | 711/170 |

FOREIGN PATENT DOCUMENTS

| JP | 57-29787 | 6/1982 |
|---|---|---|
| JP | 59-53588 | 12/1984 |
| JP | 6-309223 | 11/1994 |
| JP | 8-23843 | 3/1996 |
| JP | 9-212413 | 8/1997 |
| JP | 10-301842 | 11/1998 |

* cited by examiner

Primary Examiner—Pierre-Michel Bataille
(74) Attorney, Agent, or Firm—Young & Thompson

(57) ABSTRACT

Memory modules in the main memory have a memory device of different storage capacity from one another. BCT (Bank Control Table) has entries for units having the same storage capacity. Each entry stores valid bits each of which indicates whether or not a memory device is allocated to a combination of a relevant unit and a relevant memory module and source addresses to be converted to row addresses of the memory devices. ABPT (Address Bit Position Table) has entries for the memory modules. Each entry of ABPT stores information concerning both the number of bits of row address and the number of bits of column address of a memory device mounted on the relevant memory module. When the main memory is accessed from the processor, number determining portion determines the memory module to be accessed with reference to a line address supplied from the processor and temporally stored in the address register and the contents in the BCT. In addition, address determining portion determines the row address and column address of the memory device in the memory module to be accessed. Each buffer in implementation address buffer group stores the number of the memory module to be accessed and the row address and column address of the memory device in the memory module. The third selector selects one of outputs from the buffer group under the control of main memory output arbitrating portion.

15 Claims, 10 Drawing Sheets

FIG. 2

MAIN MEMORY 3

| Card #0 | | | | | | Card #1 | | | | | |
|---|---|---|---|---|---|---|---|---|---|---|---|
| LEFT STACK (FIRST LEFT STACK) | | RIGHT STACK (FIRST RIGHT STACK) | | LEFT STACK (SECOND LEFT STACK) | | RIGHT STACK (SECOND RIGHT STACK) | |
| FIRST MEMORY MODULE | SECOND MEMORY MODULE | THIRD MEMORY MODULE | FOURTH MEMORY MODULE | FIFTH MEMORY MODULE | SIXTH MEMORY MODULE | SEVENTH MEMORY MODULE | EIGHTH MEMORY MODULE |

FIG. 3

| | Card #0 | | | | Card #1 | | | |
|---|---|---|---|---|---|---|---|---|
| | Left Stack | | Right Stack | | Left Stack | | Right Stack | |
| | FIRST MEMORY MODULE 1GB | SECOND MEMORY MODULE NONE | THIRD MEMORY MODULE NONE | FOURTH MEMORY MODULE NONE | FIFTH MEMORY MODULE 256MB | SIXTH MEMORY MODULE 512MB | SEVENTH MEMORY MODULE 1GB | EIGHTH MORMEY MODULE 2GB |
| FIRST UNIT | 128MB 100000 | 000000 | 000000 | 000000 | 32MB 100000 | 32MB 100000 | 32MB 100000 | 32MB 100000 |
| SECOND UNIT | 128MB 100010 | 000000 | 000000 | 000000 | 32MB 100000 | 32MB 100000 | 32MB 100000 | 32MB 100000 |
| THIRD UNIT | 128MB 100100 | 000000 | 000000 | 000000 | 32MB 100001 | 32MB 100001 | 32MB 100001 | 32MB 100001 |
| FOURTH UNIT | 128MB 100110 | 000000 | 000000 | 000000 | 32MB 100001 | 32MB 100001 | 32MB 100001 | 32MB 100001 |
| FIFTH UNIT | 128MB 101000 | 000000 | 000000 | 000000 | 32MB 100010 | 32MB 100010 | 32MB 100010 | 32MB 100010 |
| SIXTH UNIT | 128MB 101010 | 000000 | 000000 | 000000 | 32MB 100010 | 32MB 100010 | 32MB 100010 | 32MB 100010 |
| SEVENTH UNIT | 128MB 101100 | 000000 | 000000 | 000000 | 32MB 100011 | 32MB 100011 | 32MB 100011 | 32MB 100011 |
| EIGHTH UNIT | 128MB 101110 | 000000 | 000000 | 000000 | 32MB 100011 | 32MB 100011 | 32MB 100011 | 32MB 100011 |
| NINTH UNIT | 000000 | 000000 | 000000 | 000000 | 000000 | 128MB 100100 | 64MB 100100 | 64MB 100100 |
| TENTH UNIT | 000000 | 000000 | 000000 | 000000 | 000000 | 128MB 100110 | 64MB 100101 | 64MB 100101 |
| ELEVENTH UNIT | 000000 | 000000 | 000000 | 000000 | 000000 | 000000 | 128MB 100110 | 128MB 100110 |
| TWELFTH UNIT | 000000 | 000000 | 000000 | 000000 | 000000 | 000000 | 128MB 101000 | 128MB 101000 |
| THIRTEENTH UNIT | 000000 | 000000 | 000000 | 000000 | 000000 | 000000 | 128MB 101010 | 128MB 101010 |
| FOURTEENTH UNIT | 000000 | 000000 | 000000 | 000000 | 000000 | 000000 | 128MB 101100 | 128MB 101100 |
| FIFTEENTH UNIT | 000000 | 000000 | 000000 | 000000 | 000000 | 000000 | 128MB 101110 | 128MB 101110 |
| SIXTEENTH UNIT | 000000 | 000000 | 000000 | 000000 | 000000 | 000000 | 101110 | 128MB 101110 |
| SEVENTEENTH UNIT | 000000 | 000000 | 000000 | 000000 | 000000 | 000000 | 000000 | 256MB 110000 |
| EIGHTEENTH UNIT | 000000 | 000000 | 000000 | 000000 | 000000 | 000000 | 000000 | 256MB 110100 |
| NINETEENTH UNIT | 000000 | 000000 | 000000 | 000000 | 000000 | 000000 | 000000 | 256MB 111000 |
| | 000000 | 000000 | 000000 | 000000 | 000000 | 000000 | 000000 | 256MB 111100 |
| BITS | 47-42 | 41-36 | 35-30 | 29-24 | 23-18 | 17-12 | 11-6 | 5-0 |

11 BCT

FIG. 4

| | THE NUMBER OF BITS OF ROW ADDRESS | | THE NUMBER OF BITS OF COLUMN ADDRESS | | |
|---|---|---|---|---|---|
| BIT | 3 | 2 | 1 | 0 | |
| ABPT 13 → | | | | | THE NUMBER OF BITS OF ADDRESS OF EIGHTH MEMORY MODULE |
| | | | | | THE NUMBER OF BITS OF ADDRESS OF SEVENTH MEMORY MODULE |
| | 1 | 0 | 0 | 0 | THE NUMBER OF BITS OF ADDRESS OF SIXTH MEMORY MODULE |
| | | | | | THE NUMBER OF BITS OF ADDRESS OF FIFTH MEMORY MODULE |
| | | | | | THE NUMBER OF BITS OF ADDRESS OF FOURTH MEMORY MODULE |
| | | | | | THE NUMBER OF BITS OF ADDRESS OF THIRD MEMORY MODULE |
| | | | | | THE NUMBER OF BITS OF ADDRESS OF SECOND MEMORY MODULE |
| | | | | | THE NUMBER OF BITS OF ADDRESS OF FIRST MEMORY MODULE |

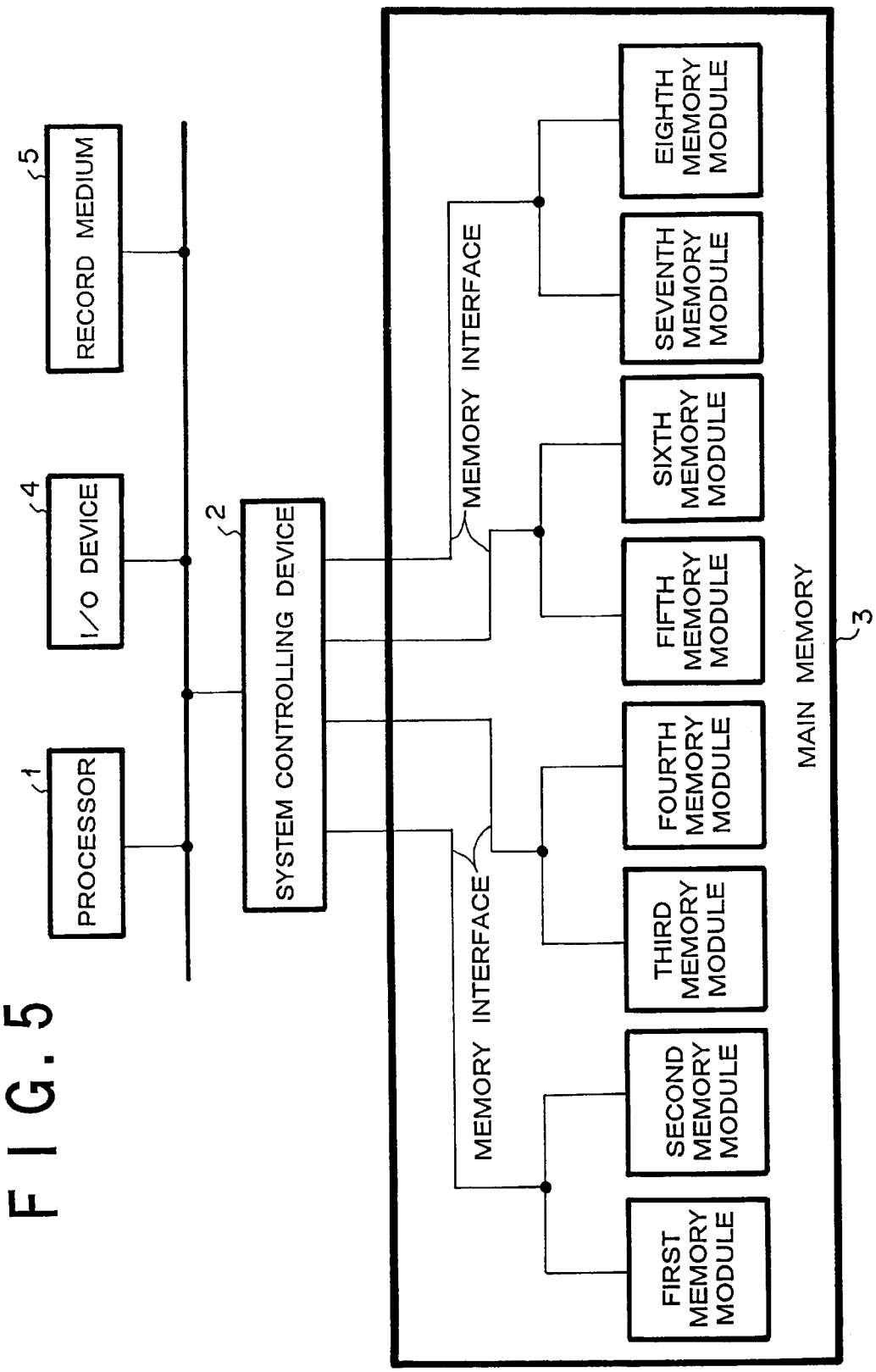
F I G. 5

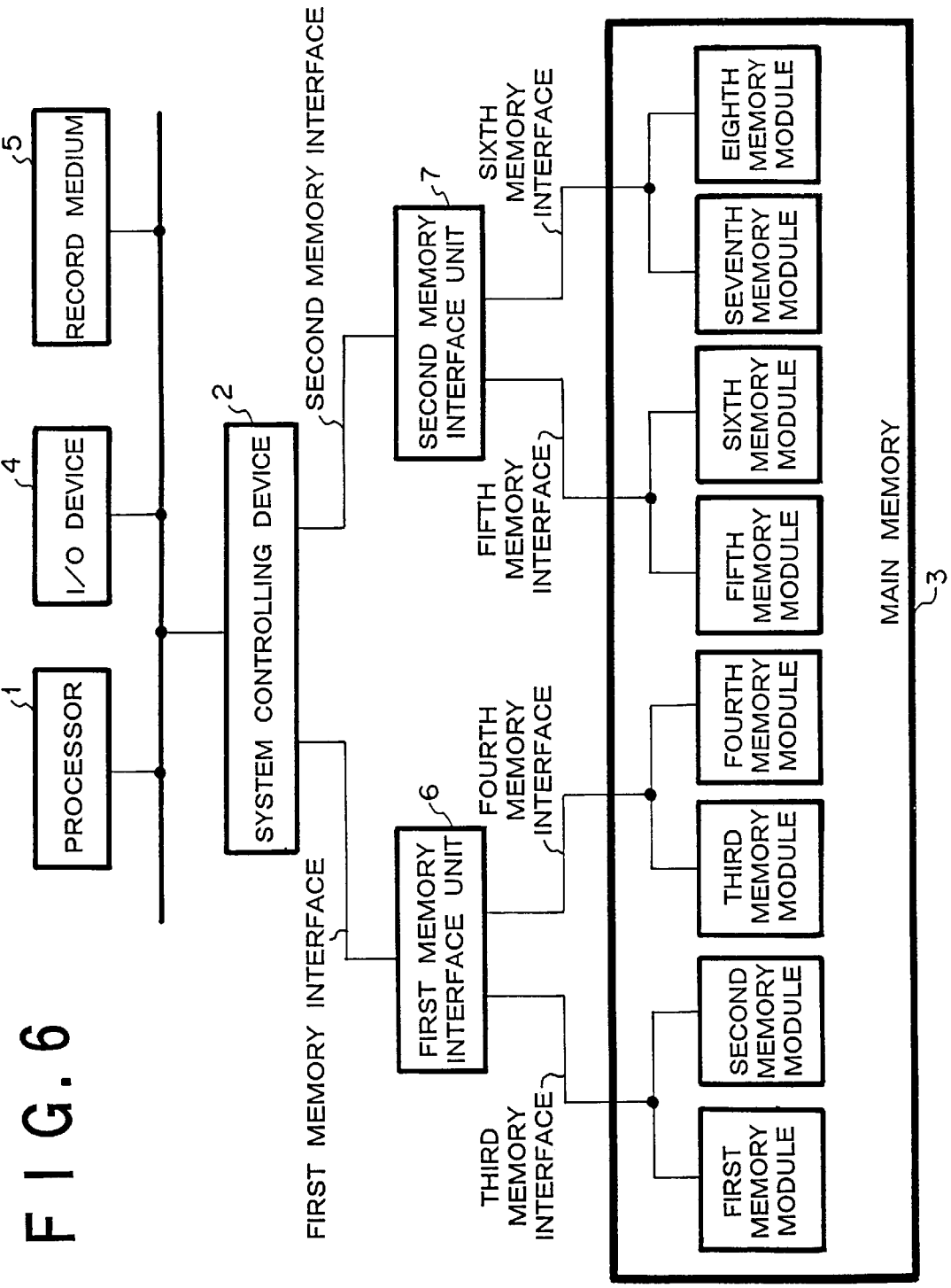
F I G. 6

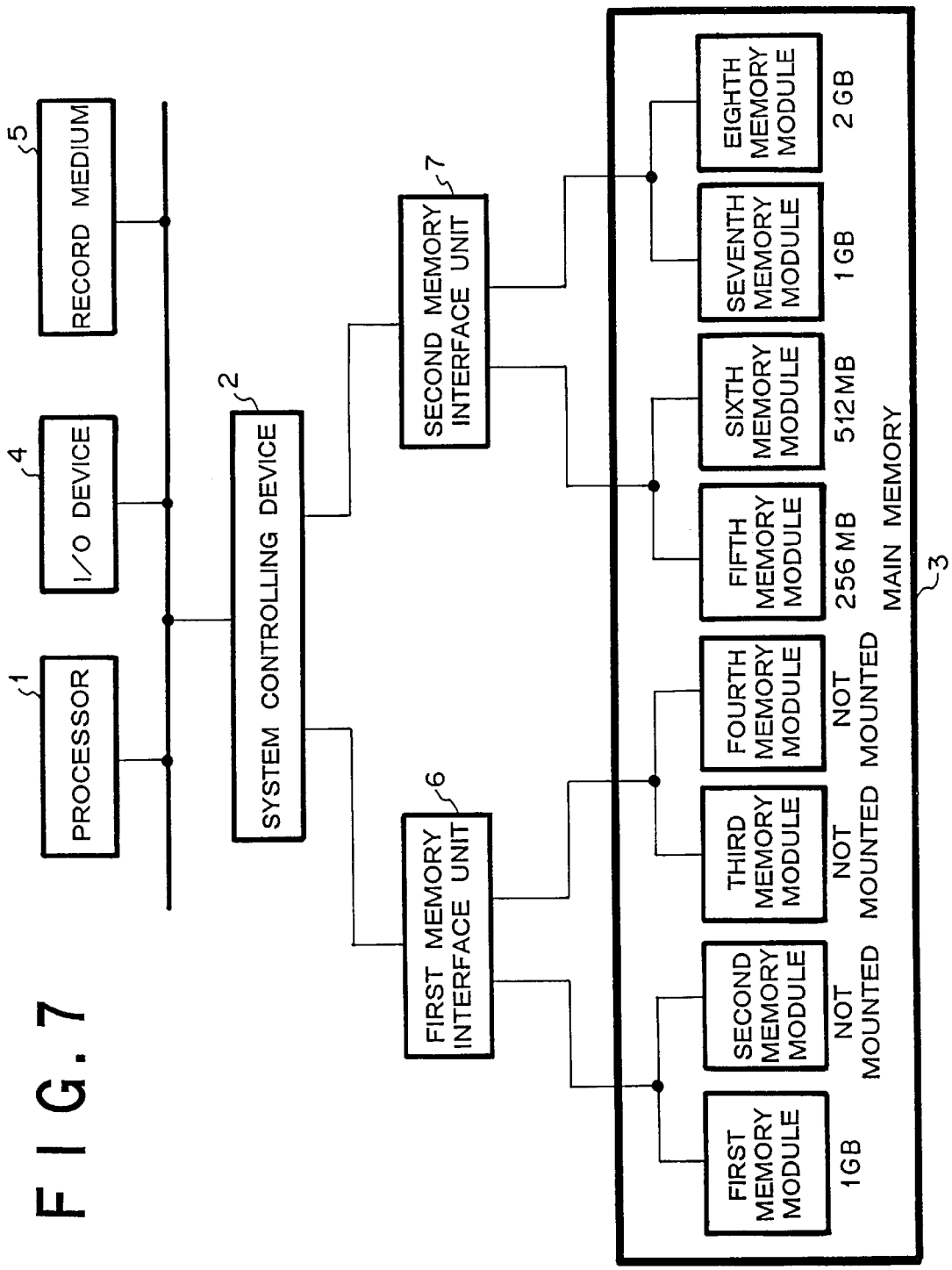
F I G. 7

SYSTEM FOR ACCESSING A MEMORY COMPRISING INTERLEAVED MEMORY MODULES HAVING DIFFERENT CAPACITIES

BACKGROUND OF THE INVENTION

1. Field of the Invention

The present invention relates to a memory access controlling system for allowing a processor to interleave-access a main memory (composed of memory devices such as a RAM (Random Access Memory) and a DRAM (Dynamic RAM)).

2. Description of the Prior Art

In a recent computer system, a controlling process for allowing the memory access speed to be raised to that close to the processor speed is used. This controlling process is referred to as an interleaving process. In the interleaving process, the main memory is divided into a plurality of areas referred to as banks. In the individual banks, data are accessed (read and written) simultaneously or alternately. Thus, the process speed of the computer system can be prevented from being lowered even when the main memory is accessed.

However, recent computer systems are being downsized and becoming open-structured. In other words, functions different from conventional mainframe functions are being desired. As an example, a function for allowing memory devices having different storage capacities to be simultaneously used as the main memory is known.

In a conventional memory access controlling system, when a main memory composed of a plurality of memory devices having different storage capacities is interleaved, the memory devices are interleaved corresponding to the smallest storage capacity of a memory device therein.

As described above, in the conventional memory access controlling system, when a main memory composed of a plurality of memory devices having different storage capacities is interleaved, since the memory devices are interleaved corresponding to the smallest storage capacity of a memory device therein, the storage capacities of the memory devices having larger storage capacities than the smallest storage capacity are not effectively used.

Since the integration of memory devices is drastically improving, when the user wants to extend the main memory, an additional memory device having a storage capacity twice or four times larger than that of a memory device already used in the main memory may be used. In this case, the above-described disadvantage will frequently occur. In order to solve such a disadvantage, if memory devices used in the main memory are substituted with memory devices having larger storage capacities than those, the original memory devices will be removed and become wasteful.

As a related art reference for dealing with a change of storage capacities for the interleave-controlling process, a technology has been disclosed as, for example, JPA 6-309223 titled "Storing Apparatus Having Memory Interleaving Function".

In the related art reference, each bank is divided into blocks with the same size. The memory implementation states of individual blocks are stored to a configuration register. When the processor designates an address to be accessed, with reference to the configuration register, the address is converted corresponding to the memory implementation state. Thus, even if the main memory is extended by one bank, the main memory can be interleaved.

However, according to such a related art reference, since only the storage capacity of each of a plurality of DRAMs and bank number information thereof are stored, if the DRAMs have different storage capacities, it is difficult to interleave the main memory.

SUMMARY OF THE INVENTION

In order to overcome the aforementioned disadvantage, the present invention has been made and accordingly, have a purpose to provide a memory access controlling system which allows a main memory composed of a plurality of memory devices having different storage capacities to be equally interleaved and the storage capacities of the memory devices to be effectively used.

According to the present invention, there is provided a memory access controlling system for hierarchically interleaving a memory in a unit of memory module and accessing the memory, comprising: a bank control table having entries corresponding to units, each of the entries containing data for a plurality of the memory modules, the data for each of the memory modules having a presence bit and a source address to be converted to a row address the memory module concerned, the presence bit representing whether or not a memory device is mounted on the memory module concerned; an address bit position table containing information which represents both the number of bits of the row address and the number of bits of the column address of a memory device, if any, mounted on each of the memory modules; a decoder for obtaining the number of the unit to be accessed on the basis of a line address which is supplied from an access source; a number determining portion for determining the memory module to be accessed on the basis of the line address and the presence bit in the data contained in an entry of the bank control table having the number obtained by the decoder; and an address determining portion for searching the address bit position table for information that represents both the number of bits of the row address and the number of bits of the column address of the memory device mounted on the memory module determined by the number determining portion, and in addition determining both the row address and the column address of the memory module to be accessed on the basis of the line address, a source address to be converted to the row address of the memory module to be accessed, the source address being included in data contained in the entry having the number obtained by the decoder, and the searched information representing both the number of bits of the row address and the number of bits of the column address.

The memory access controlling system may further comprises: a buffer group for storing a plurality of implementation addresses, each of which is composed of the number of the memory module determined by the number determining portion and the row address and column address determined by the address determining portion; and an arbitrator for arbitrating the plurality of implementation addresses stored in the buffer group.

In the memory access controlling system, an equal storage capacity may be allocated to each of the units.

In the memory access controlling system, the storage capacity of each of the units may be the same as the storage capacity of a memory module having the smallest storage capacity.

In the memory access controlling system, the hierarchy of the memory modules may have a two-branch tree structure.

In the memory access controlling system, an equal storage capacity may be allocated to gatherings in the same hierarchical level for each of the unit.

These and other objects, features and advantages of the present invention will become more apparent in light of the following detailed description of the best mode of embodiment thereof, as illustrated in the accompanying drawings.

BRIEF DESCRIPTION OF DRAWINGS

FIG. 2 is a schematic diagram showing an example of the structure of a main memory of the memory access controlling system shown in FIG. 1;

FIG. 3 is a schematic diagram showing an example of the structure of a BCT (Bank Control Table) shown in FIG. 1;

FIG. 4 is a schematic diagram showing an example of the structure of an ABPT (Address Bit Position Table) shown in FIG. 1;

FIG. 5 is a block diagram showing an example of the structure of a computer system corresponding to the memory access controlling system shown in FIG. 1;

FIG. 6 is a block diagram showing another example of the structure of the computer system corresponding to the memory access controlling system shown in FIG. 1;

FIG. 7 is a schematic diagram showing a concrete example of the implementation of memory modules in a main memory of the computer system having the structure shown in FIG. 6;

DESCRIPTION OF PREFERRED EMBODIMENT

(1) Basic Embodiment

Next, with reference to the accompanying drawings, an embodiment of the present invention will be explained.

Figure 1:
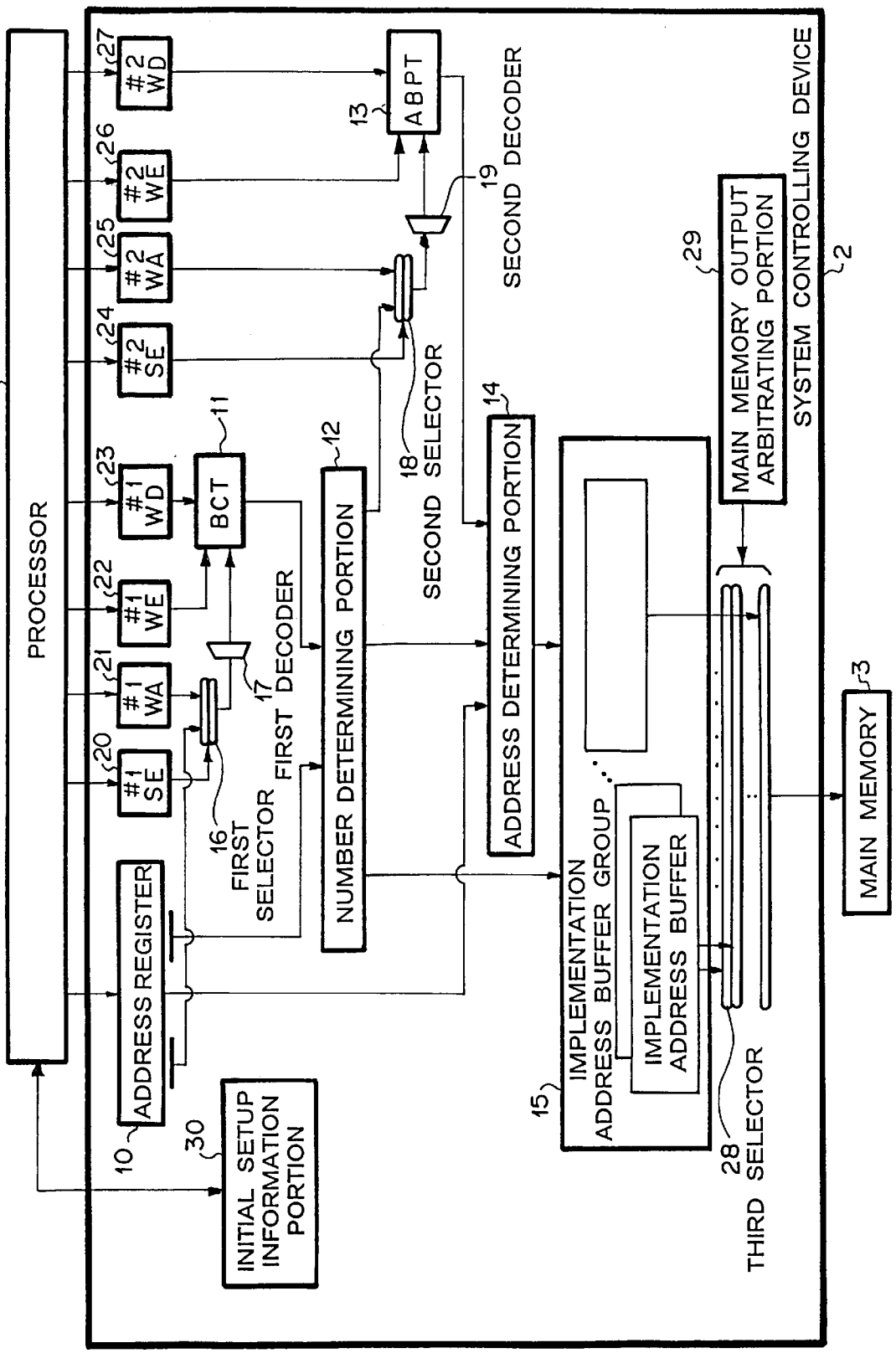
FIG. 1 is a block diagram showing an example of the structure of a memory access controlling system according to an embodiment of the present invention.

FIG. 1 is a block diagram showing the structure of a memory access controlling system according to a first embodiment of the present invention.

With reference to FIG. 1, the memory access controlling system according to the embodiment of the present invention comprises a processor 1, a system controlling device 2, and a main memory 3.

The system controlling device 2 comprises an address register 10, a BCT 11, a number determining portion 12, an ABPT 13, an address determining portion 14, an implementation address buffer group 15, a first selector 16, a first decoder 17, a second selector 18, a second decoder 19, a first read/write select signal register (denoted by "#SE1" in FIG. 1) 20, a first write address register (denoted by "#1WA" in FIG. 1) 21, a first write enable register (denoted by "#1WE" in FIG. 1) 22, a first write data register (denoted by "#1WD" in FIG. 1) 23, a second read/write select signal register (denoted by "#2SE" in FIG. 1) 24, a second write address register (denoted by "#2WA" in FIG. 1) 25, a second write enable register (denoted by "#2WE" in FIG. 1) 26, a second write data register (denoted by "#2WD" in FIG. 1) 27, a third selector 28, a main memory output arbitrating portion 29, and an initial setup information portion 30. The read/write select signal is a signal representing that any of a read operation or a write operation is selected, that is an access from the processor 1 to a data in the main memory is selected. In other words, the read/write select signal is not a signal representing whether a read operation or a write operation is selected, but is a signal representing whether the access or an initialization process of the system controlling device 2 is selected.

The address register 10 temporarily stores a line address (a physical address) that is sent from the processor 1.

The BCT 11 has entries for individual units, that is, storage areas each of which has a unit storage capacity. Each entry contains valid bits (V bits) each representing whether each memory module in each unit has a memory device (for example, a DRAM) implemented. For a module having a memory device implemented, each entry contains a source address to be converted to a row address of the memory device.

When the main memory is accessed, the number determining portion 12 determines a card number, a stack number, and a memory module number to be accessed corresponding to the line address sent from the processor 1 and information stored in the BCT 11. The card number, the stack number, and the memory module number will be explained later.

The ABPT 13 has entries for individual memory modules which are implemented to the main memory 3. Each entry contains information concerning both the number of bits of the row address and the number of bits of the column address of the relevant memory module.

When the main memory is accessed, the address determining portion 14 searches the ABPT 13 on the basis of the determined result of the number determining portion 12 and determines an implementation address (the row address, the column address, and so forth with which the main memory 3 is accessed) on the basis of both the number of bits of the row address and the number of bits of the column address obtained from the ABPT 13, the line address sent from the processor 1, and a source address to be converted to the row address. The source address is read from the BCT 11 (the source address is referred to as BCT read row address).

The implementation address buffer group 15 is a set of implementation address buffers each of which stores an implementation address composed of a card number, a stack number, a memory module number, and both a row address and a column address of the memory module. The implementation address is obtained by the number determining portion and the address determining portion 14.

The first selector 16 alternatively causes a write address which is to be sent from the processor 1 to the BCT 11 when an initialization is performed or a line address which to be sent from the processor 1 to the BCT 11 when the main memory is accessed to be validated and outputs the validated address to the first decoder 17.

The first decoder 17 performs a decoding process so as to search the BCT 11.

The second selector 18 validates the write address which is sent from the processor 1 to the ABPT 13 when an initialization is performed and the determined result which is sent from the number determining portion 12 when the main memory is accessed, and outputs the validated one to the second decoder 19.

The second decoder 19 performs a decoding process so as to search the ABPT 13.

The first read/write select signal register 20 temporarily stores a read/write select signal for switching the first selector 16.

The first write address register 21 temporarily stores a write address for the BCT 11.

The first write enable register 22 temporarily stores a write enable signal for the BCT 11.

The first write data register 23 temporarily stores information to be written to the BCT 11 (this information is referred to as write data).

The second read/write select signal register 24 temporarily stores a read/write select signal for switching the second selector 18.

The second write address register 25 temporarily stores a write address for the ABPT 13.

The second write enable register 26 temporarily stores a write enable signal for the ABPT 13.

The second write data register 27 temporarily stores information to be written to the ABPT 13 (this information is referred to as write data).

The third selector 28 selects an implementation address to be sent from the implementation address buffer group 15 to the main memory 3.

The main memory output arbitrating portion 29 creates a selection condition of the third selector 28.

The initial setup information portion 30 stores implementation memory information, which is the information of each memory module implemented to the main memory 3. The implementation memory information is composed of BCT setup implementation memory information and ABPT setup implementation memory information.

FIG. 2 is a schematic diagram showing an example of the structure of the main memory 3 shown in FIG. 1.

Referring to FIG. 2, the main memory 3 of this example is composed of a first card (Card #0) and a second card (Card #1).

Each of the first card and the second card is composed of four memory modules, that is, the first card is composed of a first memory module, a second memory module, a third memory module, and a fourth memory module, while the second card is composed of a fifth memory module, a sixth memory module, a seventh memory module, and an eighth memory module.

The first memory module and the second memory module among the four memory modules in the first card constitute a first left stack. Likewise, the third memory module and the fourth memory module constitute a first right stack.

Likewise, the fifth memory module and the sixth memory module among the four memory modules in the second card constitute a second left stack. Likewise, the seventh memory module and the eighth memory module constitute a second right stack.

Thus, the main memory 3 has an interleaved hierarchy composed of card, stack, and memory module in this order. Details about the interleaved hierarchy will be explained later with reference to FIG. 10.

FIG. 3 is a schematic diagram showing an example of the structure of the BCT 11 shown in FIG. 1 (corresponding to the main memory 3 shown in FIG. 2). The storage capacities (for example, 128 MB for the combination of the first unit and the first memory module) of the storage area of each memory module corresponding to the entry of each unit is just an example, and are not stored in the BCT 11.

Referring to FIG. 3, the BCT 11 is composed of a number of entries (composed of data of 48 bits (bit 0 to bit 47)). The number of entries corresponds to the number of units. The 48 bits are for eight modules and 6 bits are for each module.

Data of six bits corresponding to each memory module in the entry of a particular unit is composed of a valid bit (V bit) and five bits of a source address to be converted the row address of the storage area of the memory module. The V bit is "1" when a memory area of the unit concerned is implemented in the storage area of the memory module concerned. When the V bit is "1", the five bits represents a source address to be converted to the row address of a memory device (such as a DRAM) which is mounted on the memory module.

In other words, bits (47–42), (41–36), (35–30), (29–24), (23–18), (17–12), (11–6), and (5–0) of each entry represent a V bit and a source address to be converted to a row address of the storage area of the first memory module, the second memory module, the third memory module, the fourth memory module, the fifth memory module, the sixth memory module, the seventh memory module, and the eighth memory module, respectively. In the example, the notation of "bits (x–y)" represents a bit group of bit x to bit y (for instance, "bits (47–42)" represents a bit group of bit 47 to bit 42).

FIG. 4 shows an example of the structure of the ABPT 13 shown in FIG. 1 (corresponding to the main memory 3 shown in FIG. 2 and the BCT 11 shown in FIG. 3).

Referring to FIG. 4, the ABPT 13 has first to eighth entries containing values representing both the number of bits of the row addresses and the number of bits of the column addresses of the first memory module to the eighth memory module, respectively.

In FIG. 4, the number of bits of the address of each memory module (namely, the number of bits of each row address and the number of bits of each column address) represented by a value contained in the ABPT 13 depends on the storage capacity and type of each memory device which is mounted on each memory module. In this example, it is assumed that the number of bits of the row address of any memory device is in the range of from 10 to 13 and that the number of bits of the column address of the memory device is in the range of from 8 to 11.

Each entry of the ABPT 13 is composed of fist two bits which represent the number of bits of the row address (where "00" (binary) represents that the number of bits is 10 (decimal); "01" (binary) represents that the number of bits is 11 (decimal); "10" (binary) represents that the number of bits is 12 (decimal); "11" (binary) represents that the number of bits is 13 (decimal)) and second two bits which represent the number of bits of the column address (where "00" (binary) represents that the number of bits is 8 (decimal); "01" (binary) represents that the number of bits is 9 (decimal); "10" (binary) represents that the number of bits is 10 (decimal); and "11" (binary) represents that the number of bits is 11 (decimal)). In this example, bits (3–2) represent the number of bits of the row address, whereas bits (1–0) represent the number of bits of the column address.

FIG. 5 is a block diagram showing an example of the structure of a computer system corresponding to the memory access controlling system according to the embodiment of the present invention.

The computer system comprises the processor 1, the system controlling device 2, the main memory 3, an I/O (Input/Output) device 4, and a record medium 5.

In the computer system, the individual memory modules (the first memory module to the eighth memory module) in the main memory 3 are directly connected to the system controlling device 2 (through a single memory interface between the system controlling device 2 and each of the memory modules).

FIG. 6 is a block diagram showing another example of the structure of the computer system corresponding to the memory access controlling system according to the embodiment of the present invention.

The computer system shown in FIG. 6 comprises the processor 1, the system controlling device 2, the main memory 3, the I/O device 4, the record medium 5, a first memory interface unit 6, and a second memory interface unit 7. The first memory interface unit 6 is composed of a relaying LSI (Large Scale Integration) circuit and so forth.

In the computer system, each of the memory modules (the first memory module to the eighth memory module) in the main memory 3 is connected to the system controlling device 2 through a memory interface unit (the first memory interface unit 6 or the second memory interface unit 7). There are two stages of memory interfaces between the system controlling device 2 and each of the memory modules. In other words, a first memory interface is disposed between the system controlling device 2 and the first memory interface unit 6. A second memory interface is disposed between the system controlling device 2 and the second memory interface unit 7. A third memory interface is disposed between the first memory interface unit 6 and each of the first memory module and the second memory module. A fourth memory interface is disposed between the first memory interface unit 6 and each of the third memory module and the fourth memory module. A fifth memory interface is disposed between the second memory interface unit 7 and each of the fifth memory module and the sixth memory module. A sixth memory interface is disposed between the second memory interface unit 7 and each of the seventh memory module and the eighth memory module.

FIG. 7 is a schematic diagram showing an example of the implementation of memory modules of the main memory 3 in the computer system corresponding to the memory access controlling system according to the embodiment of the present invention (in this example, the structure of the computer system shown in FIG. 7 is the same as the structure of the computer system shown in FIG. 6).

In this example, the storage capacity of the first memory module is 1 GB. The storage capacity of the fifth memory module is 256 MB. The storage capacity of the sixth memory module is 512 MB. The storage capacity of the seventh memory module is 1 GB. The storage capacity of the eighth memory module is 2 GB. The second memory module, the third memory module, and the fourth memory module is not implemented.

Figure 8:
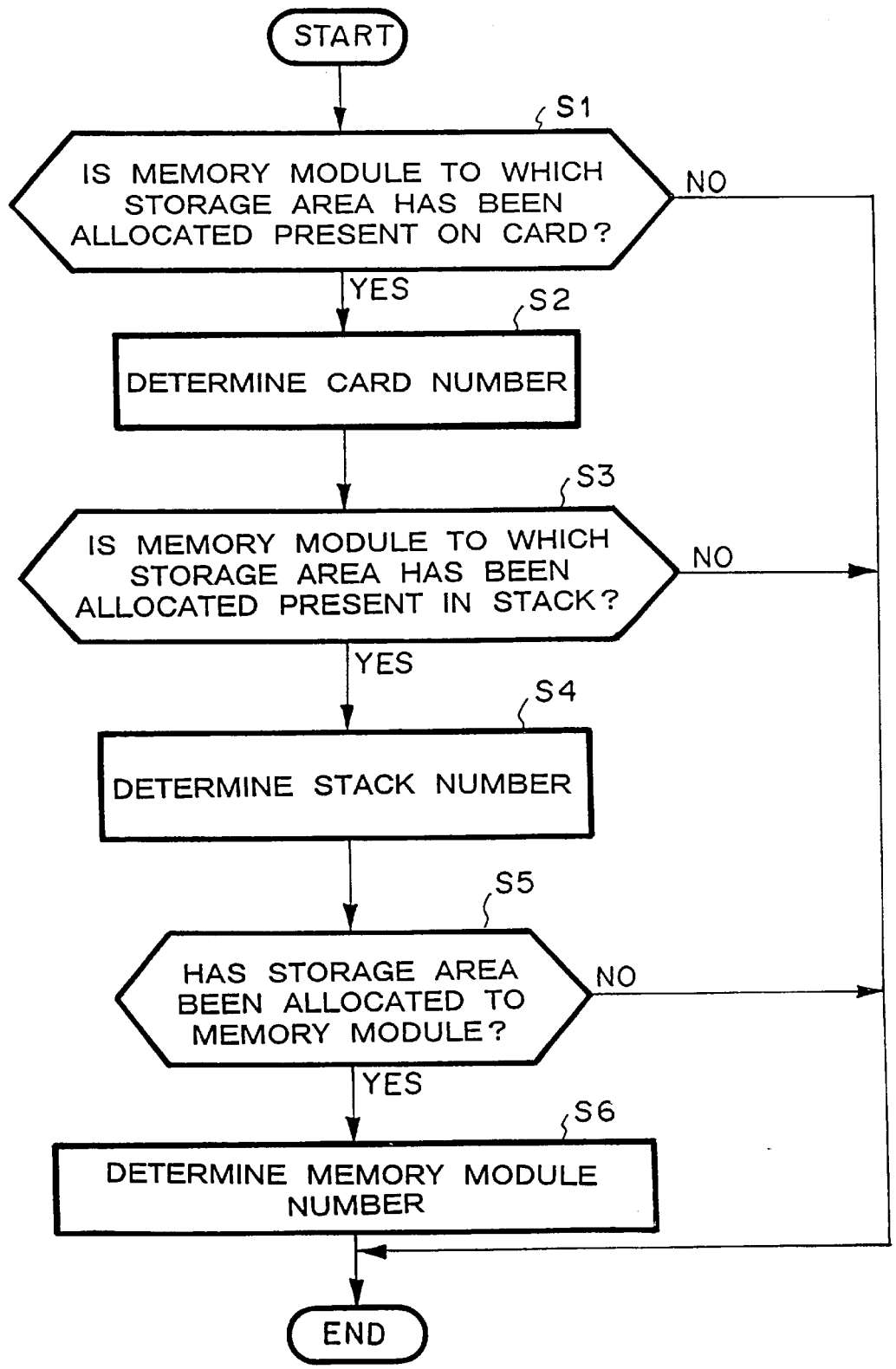
FIG. 8 is a flow chart showing a process of a number determining portion corresponding to the memory controlling system shown in FIG. 1.

FIG. 8 is a flow chart showing a process of the number determining portion 12 corresponding to the memory controlling system according to the embodiment of the present invention. The process comprises the steps of determining whether or not a memory module to which a storage area has been allocated is present on a card (at step S1), determining a card number (at step S2), determining whether or not a memory module to which a storage capacity has been allocated is present in a stack (at step S3), determining a stack number (at step S4), determining whether or not a storage area has been allocated to a memory module (at step S5), and determining a memory module number (at step S6).

Figure 9:
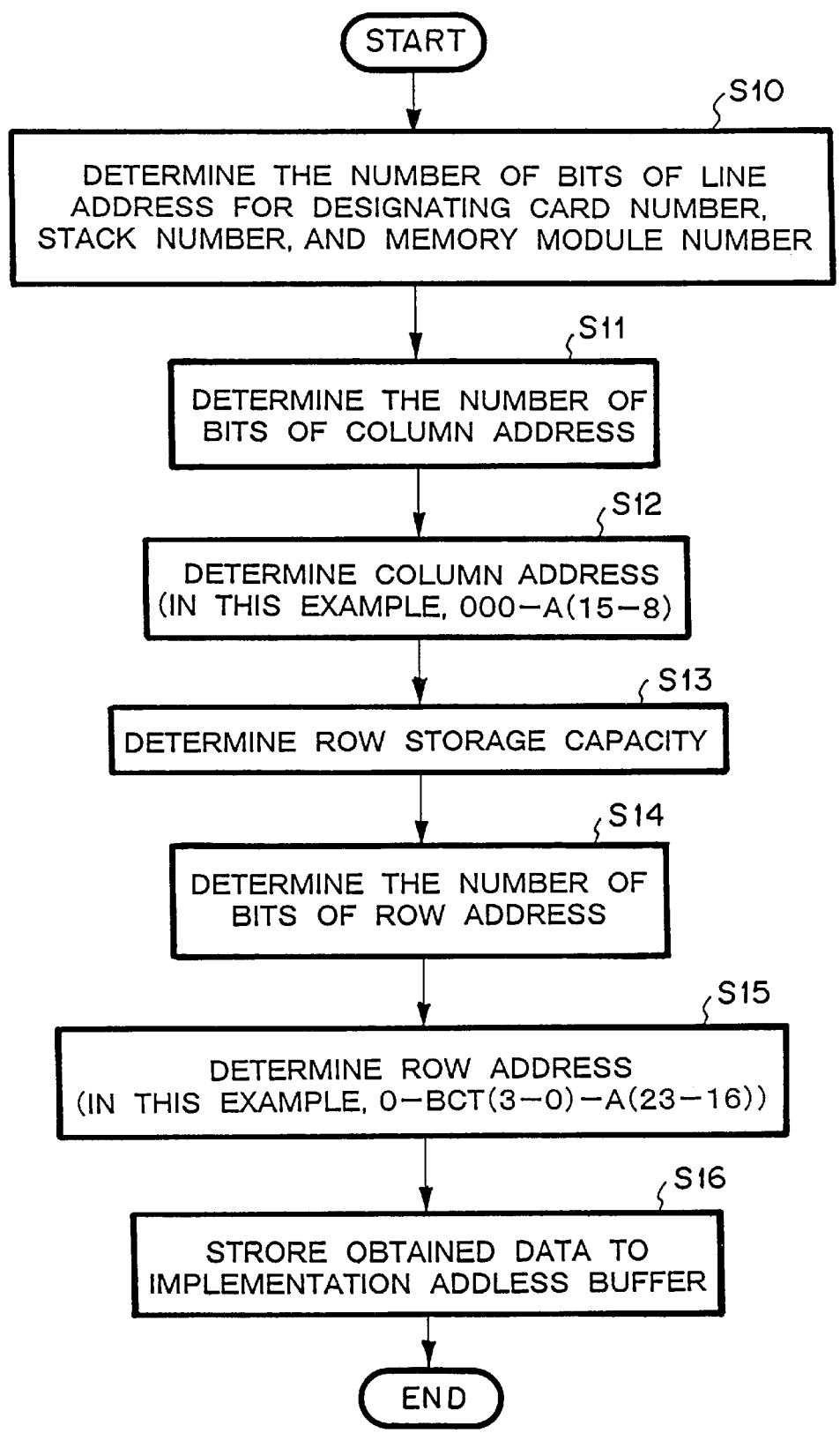
FIG. 9 is a chart showing a process of an address determining portion corresponding to the memory access controlling system shown in FIG. 1.

FIG. 9 is a flow chart showing a process of the address determining portion 14 corresponding to the memory access controlling system according to the embodiment of the present invention. The process comprises the steps of determining the number of bits of a line address for designating a card number, a stack number, and a memory module number (at step S10), determining the number of bits of a column address (at step S11), determining the column address (at step S12), determining a row storage capacity (at step S13), determining the number of bits of a row address (at step S14), determining the row address (at step S15), and storing obtained data to an implementation address buffer (at step S16).

Figure 10:
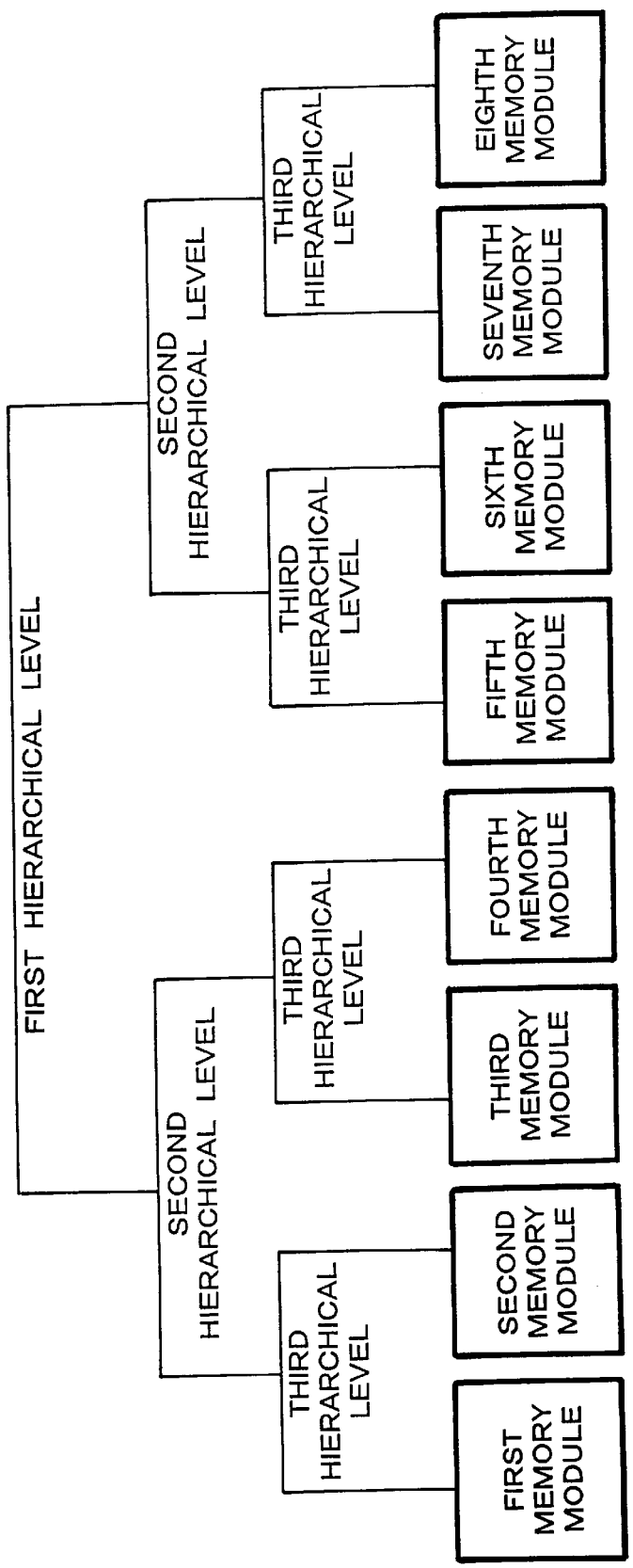
FIG. 10 is a block diagram showing an example of an interleaved hierarchy of the computer system corresponding to the memory access controlling system shown in FIG. 1.

FIG. 10 is a block diagram showing an example of an interleaved hierarchy of the computer system corresponding to the memory access controlling system according to the embodiment of the present invention. The interleaved hierarchy of the main memory 3 shown in FIGS. 2, 5, 6, and 7 corresponds to the interleaved hierarchy shown in FIG. 10.

According to the embodiment of the present invention, in the interleaved hierarchy corresponding to the memory access controlling system, from the highest hierarchical level (in which the entire main memory 3 is treated as one gathering) to the lowest hierarchical level (in which a memory module is treated as one gathering), one node in a particular hierarchical level (namely, the main memory 3, a card, or a stack in this embodiment) is followed by two nodes (namely, a card, a stack, or a memory module in this embodiment) as the immediately lower hierarchical level. This interleaved hierarchy basically corresponds to the hardware structure of the main memory 3 (namely, cards, stacks, and memory modules in this embodiment). However, it should be noted that the interleaved hierarchy can be accomplished supposing logical hierarchical levels.

Next, the operation of the memory access controlling system according to the embodiment of the present invention will be explained. In this embodiment, it is assumed that memory modules have been implemented to the main memory 3 as shown in FIG. 7. In general, the unit capacity of the main memory 3 is the same as the storage capacity of the smallest memory modules implemented thereto. In this example of the embodiment, since the storage capacity of the fifth memory module is the smallest among memory modules, the unit capacity is 256 MB which is the same as the storage capacity of the fifth memory module.

First of all, the operation of the memory access controlling system performed when the BCT 11 is initialized will be described.

When the BCT 11 is initialized, the processor 1 obtains BCT setup implementation memory information for each memory module from the main memory 3 and writes the BCT setup implementation memory information to the initial setup information portion 30.

The BCT setup implementation memory information is the information that represents the storage capacity and the number of bits of the row address of each memory module.

Thereafter, the processor 1 sets the write enable signal in the first write enable register 22 to "1" (ON). At this point, the first selector 16 validates a write address which is sent from the processor 1 corresponding to a read/write select signal which enables the write operation. The read/write select signal is stored to the first read/write select signal register 20 under the control of the processor 1. The write address has been stored in the first write address register 21.

In this state, the processor 1 initializes the BCT 11 using the BCT setup implementation memory information stored in the initial setup information portion 30 in steps (a) to (g) as follow:

(a) With reference to the storage capacity of each memory module, the processor 1 defines the storage capacity of a memory module having the smallest storage capacity among the implemented memory modules as the unit capacity.

(b) The processor 1 divides all the memory area of the main memory 3 by the unit capacity in order to set units. Thus, the storage capacity of one unit is equal to the storage capacity of the memory modules having the smallest storage capacity.

(c) The processor 1 determines whether or not a memory module (or memory modules) having a storage capacity (or capacities) not being allocated to any other unit yet is (or are) connected to each of two nodes just preceded by a node in a hierarchical level subjected to step (c) this time. It should be noted that even if a memory module has been implemented, the memory module may or may not have a storage area not allocated yet.

(d) When a memory module (or modules) having storage capacity (or capacities) not being allocated to any other unit is (or are) connected to one of the two nodes and a memory module (or modules) having storage capacity (or capacities) not being allocated to any other unit is (or are) connected to the other of the two nodes, the processor 1 equally allocates the memory area which has been allocated to the hierarchical level subjected to step (c) to the two nodes in the just lower hierarchical level.

(e) On the other hand, when a memory module (or modules) having storage capacity (or capacities) not being allocated to any other unit is (or are) connected to one of the two nodes and no memory module having storage capacity not being allocated to any other unit is connected to the other of the two nodes, the processor 1 allocates all of the memory area which has been allocated to the hierarchical level subjected to step (c) the one node out of the two nodes in the just lower hierarchical level.

(f) The processor 1 repeats steps (c) to (e) for hierarchical levels, if any, and for all the units. Thus, the processor 1 allocates the memory area of each unit to memory modules which are present in the unit.

In accordance with steps (d) and (e), an equal storage capacity is allocated to gatherings in each hierarchical level.

(g) For a combination of a unit and a module, if the combination is allocated a memory area, the processor 1 stores a source address to be converted to a row address and sets the V bit to "1" which represents "valid". The source address is generated on the basis of the size of the memory areas allocated to combinations of a unit and a module and a capacity of the memory device mounted on the module. On the other hand, for a combination of a unit and a module, if the combination is not allocated a memory area, the processor 1 resets the V bit to "0" which represents "not valid".

As is apparent from the above explanation, assuming that the storage capacity of one unit (unit storage capacity) is 256 MB, in order to equally interleave two cards, a storage capacity of 128 MB should be equally allocated to each of the two cards. Similarly, in order to equally interleave two stacks, a storage capacity of 64 MB should be equally allocated to each of the two stacks. Further, in order to equally interleave two memory modules, a storage capacity of 32 MB should be equally allocated to each of the two memory modules.

Thus, when memory modules have been implemented as shown in FIG. 7, the first memory module is allocated a storage area of 128 MB for each of the first unit to the eighth unit. Each of the fifth memory module to the eighth memory module is allocate a storage area of 32 MB for each of the first unit to the eight unit.

In the above example, the first memory module and the fifth memory module do not have a storage area allocated to the ninth unit. Thus, the sixth memory module is allocates a storage area of 128 MB for the ninth unit. The seventh memory module is allocated a storage area of 64 MB for the ninth unit. The eighth memory module is allocated a storage area of 64 MB for the ninth unit.

Since the similar process is repeated for the tenth unit and the later units, then the BCT 11 having the contents shown in FIG. 3 is created.

Secondly, the operation in which the ABPT 13 is initialized will be explained.

When the ABPT 13 is initially set, the processor 1 obtains ABPT setup implementation memory information for each memory module from the main memory 3.

The ABPT setup implementation memory information is the information which represents the storage capacity and type of each memory module (or each memory device) implemented to the main memory 3. Both the number of bits of the row address and the number of bits of the column address represented by the information contained in each entry of the ABPT 13 depend on the storage capacity and type of each memory device which constitutes each memory module. In this example, as was described above, it is assumed that the number of bits of the row address is in the range of from 0 to 13 and that the number of bits of the column address is in the range of from 8 to 11.

When the processor 1 sets a write enable signal (information stored in the second write enable register 26) to "1", the second selector 18 validates a write address (stored in the second write address register 25) which is sent from the processor 1 corresponding to a read/write select signal (information stored in the second read/write select signal register 24).

Thus, the processor 1 stores the information which represents both the number of bits of the row address and the number of bits of the column address of a memory device implemented to each memory module to the entry of the ABPT 13 (see FIG. 4).

Thirdly, assuming that the BCT 11 and the ABPT 13 have been initialized as explained above, an interleaved memory access operation will be explained.

When the processor 1 sends a line address (physical address) of a memory area to be accessed to the system controlling device 2, the device 2 starts accessing the memory area. When the system controlling device 2 receives the line address, the address is temporarily stored in the address register 10.

The processor 1 sends a read/write select signal that represents "memory access" to the system controlling device 2. The information of the signal is stored to the first read/write select signal register 20 and the second read/write select signal register 24.

First of all, the process of the number determining portion 12 using the BCT 11 will be explained.

The first selector 16 validates a write address received from the address register 10 corresponding to a read/write select signal (information stored in the first read/write select signal register 20) received from the processor 1. The read/write select signal represents that the memory access is being performed. The first selector 16 sends the line address to the first decoder 17.

The first decoder 17 decodes a predetermined bit group stored in the address register 10. The predetermined bit group is, for example, a bit group of from bit 31 to bit 25.

The number determining portion 12 searches the BCT 11 with a key of the result from the decoder 17. The result is a BCT address obtained by the decoding operation of the decoder 17. The BCT address is information which represents an entry of the BCT 11.

The number determining portion 12 determines a card number, a stack number, and a memory module number on the basis of data of 48 bits retrieved from the BCT 11 (data of an entry of the BCT 11 corresponding to the unit to be accessed) and information of the line address stored in the address register 10.

In this embodiment, it is assumed that the main memory is accessed in a unit of 32 byte. Therefore, bits (4–0) of the line address is not used for designating an address of the main memory and bits (7–5) of the line address is used to interleave the main memory.

Referring to FIG. 3, for the first to eighth units, the first module has a memory device of a storage capacity of 128 MB and each of the fifth to eighth memory modules has a memory device of a storage capacity of 32 MB. Therefore, for a value of from "000" (binary) to "011" (binary) of bits (7–5) of the line address, the first memory module is accessed. For a value of "100" (binary) of bits (7–5) of the line address, the fifth memory module is accessed. For a value of "101" (binary) of bits (7–5) of the line address, the sixth memory module is accessed. For a value of "110" (binary) of bits (7–5) of the line address, the seventh memory module is accessed. For a value of "111" (binary) of bits (7–5) of the line address, the eighth memory module is accessed.

The storage capacity of a memory device in each memory module is determined by a combination of valid bits for eight modules. Valid bits are bit 47, bit 41, bit 35, bit 29, bit 23, bit 17, bit 11, and bit 5 out of bits (47–0) read from BCT 11. Since a logical OR of bit 47, bit 41, bit 35, and bit 29 is "1" and a logical OR of bit 23, bit 17, bit 11, and bit 5 is "1", it is determined that the card #0 and the card #1 has the same capacity which is 128 MB. Since a logical OR of bit 47 and bit 41 is "1" and a logical OR of bit 35 and bit 29 is "0", it is determined that the first left stack has all the storage capacity of the card #0 and the first right stack has no storage capacity. Therefore, it is determined that the first left stack has a storage capacity of 128 MB and the third memory module and the fourth memory module have no storage capacity. Since bit 47 is "1" and bit 41 is "0", it is determined that the first memory module has all the storage capacity of the first left stack and the second memory module has no storage capacity. Therefore, it is determined that the first memory module has a storage capacity of 128 MB and the second memory module has no storage capacity. Since a logical OR of bit 23 and bit 17 is "1" and a logical OR of bit 11 and bit 5 is "1", it is determined that the second left stack and the second right stack have the same storage capacity which is 64 MB. Since bit 23 is "1" and bit 17 is "1" and a logical OR of bit 11 and bit 5 is "1", it is determined the fifth memory module and the sixth memory module have the same storage capacity which is 32 MB. Since bit 11 is "1" and bit 5 is "1", it is determined that the seventh memory module and the eighth memory module have the same storage capacity which is 32 MB.

For the ninth to tenth units, the sixth module has a memory device of a storage capacity of 128 MB and each of the seventh to eighth memory modules has a memory device of a storage capacity of 64 MB. Therefore, for a value of from "000" (binary) to "011" (binary) of bits (7–5) of the line address, the sixth memory module is accessed. For a value of from "100" (binary) to "101" (binary) of bits (7–5) of the line address, the seventh memory module is accessed. For a value of from "110" (binary) to "111" (binary) of bits (7–5) of the line address, the eighth memory module is accessed.

The storage capacity of a memory device in each memory module is determined by a combination of valid bits for eight modules. Valid bits are bit 47, bit 41, bit 35, bit 29, bit 23, bit 17, bit 11, and bit 5 out of bits (47–0) read from BCT 11. Since a logical OR of bit 47, bit 41, bit 35, and bit 29 is "0" and a logical OR of bit 23, bit 17, bit 11, and bit 5 is "1", it is determined that the card #0 has no capacity and the card #1 has a memory capacity of 256 MB. Therefore, it is determined that the first to fourth memory modules have no storage capacity. Since a logical OR of bit 23 and bit 17 is "1" and a logical OR of bit 11 and bit 5 is "1", it is determined that the second left stack and the second right stack have the same storage capacity which is 128 MB. Since bit 23 is "0" and bit 17 is "1", it is determined that the fifth memory module has no memory capacity and the sixth memory module has a memory capacity of 128 MB. Since bit 11 is "1" and bit 5 is "1", it is determined that the seventh memory module and the eighth memory module have the same storage capacity which is 64 MB.

For the eleventh to fifteenth units, each of the seventh memory module and the eighth memory module has a memory device of a storage capacity of 128 MB Therefore, for a value of from "000" (binary) to "011" (binary) of bits (7–5) of the line address, the seventh memory module is accessed. For a value of from "100" (binary) to "111" (binary) of bits (7–5) of the line address, the eighth memory module is accessed.

The storage capacity of a memory device in each memory module is determined by a combination of valid bits for eight modules. Valid bits are bit 47, bit 41, bit 35, bit 29, bit 23, bit 17, bit 11, and bit 5 out of bits (47–0) read from BCT 11. Since a logical OR of bit 47, bit 41, bit 35, and bit 29 is "0" and a logical OR of bit 23, bit 17, bit 11, and bit 5 is "1", it is determined that the card #0 has no capacity and the card #1 has a memory capacity of 256 MB. Therefore, it is determined that the first to fourth memory modules have no storage capacity. Since a logical OR of bit 23 and bit 17 is "0" and a logical OR of bit 11 and bit 5 is "1", it is determined that the second left stack has no storage capacity and the second right stack has a storage capacity of 256 MB. Therefore, it is determined that the fifth and sixth memory modules have no storage capacity. Since bit 11 is "1" and bit 5 is "1", it is determined that the seventh memory module and the eighth memory module have the same storage capacity which is 128 MB.

For the sixteenth to noneteenth units, the eighth memory module has a memory device of a storage capacity of 256 MB Therefore, for a value of from "000" (binary) to "111" (binary) of bits (7–5) of the line address, the eighthmemory module is accessed.

The storage capacity of a memory device in each memory module is determined by a combination of valid bits for eight modules. Valid bits are bit 47, bit 41, bit 35, bit 29, bit 23, bit 17, bit 11, and bit 5 out of bits (47–0) read from BCT 11. Since a logical OR of bit 47, bit 41, bit 35, and bit 29 is "0" and a logical OR of bit 23, bit 17, bit 11, and bit 5 is "1", it is determined that the card #0 has no capacity and the card #1 has a memory capacity of 256 MB. Therefore, it is determined that the first to fourth memory modules have no storage capacity. Since a logical OR of bit 23 and bit 17 is "0" and a logical OR of bit 11 and bit 5 is "1", it is determined that the second left stack has no storage capacity and the second right stack has a storage capacity of 256 MB.

Therefore, it is determined that the fifth and sixth memory modules have no storage capacity. Since bit 11 is "0" and bit 5 is "1", it is determined that the seventh memory module has no storage capacity and the eighth memory module have a storage capacity of 256 MB.

The number of the card to be accessed, the number of the stack to be accessed, and the number of the memory module to be accessed are determined on the basis of a part of data consisting of 48 bits read from BCT 11 and the line address.

The following is an explanation on the method of determining the above numbers. In the following explanation, a case where the ninth entry of BCT 11 is read and the value of bits (7–5) of the line address "101" is exemplified. Because the memory access is executed in a unit of 32 bytes, bits (4–0) are not used.

First, number determining portion 12 determines whether or not each card has at least one memory module to which a memory area is allocated (at step S1). At step S1, if a logical OR of bit 47, bit 41, bit 35, and bit 29 is "1", then it is determined that there is at least a memory module to which a memory area is allocated in the first card. Similarly, if a logical OR of bit 23, bit 17, bit 11, and bit 5 is "1", then it is determined that there is at least a memory module to which a memory area is allocated in the second card. In this case, because both logical ORs are "1", it is determined both the first card and the second card have at least a memory module to which a memory area is allocated.

Here, the card to be accessed is determined on the basis of bit 7 of the line address. In this case, because bit 7 is "1", the second card should be accessed. If only one card has at least a memory module to which a memory area is allocated and the other card has no memory module to which a memory area is allocated, then the former card should be accessed regardless of bit 7 (at step S2).

Next, number determining portion 12 determines whether or not each stack in the determined card has at lease one memory module to which a memory area is allocated (at step S3). At step S3, if a logical OR of bit 23 and bit 17 is "1", then it is determined that there is at least a memory module to which a memory area is allocated in the second left stack. Similarly, if a logical OR of bit 11 and bit 5 is "1", then it is determined that there is at least a memory module to which a memory area is allocated in the second right stack. In this case, because both logical ORs are "1", it is determined both the second left stack and the second right stack have at least a memory module to which a memory area is allocated.

Here, the stack to be accessed is determined on the basis of bit 6 of the line address if bit 5 has been used to determine the card to be accessed. On the other hand, the stack to be accessed is determined on the basis of bit 7 of the line address if bit 7 has not been used to determine the card to be accessed. In this case, bit 7 has been used and bit 6 is "0", the second left stack should be accessed. If only one stack has at least a memory module to which a memory area is allocated and the other stack has no memory module to which a memory area is allocated, then the former stack is accessed regard less of the bit concerned, that is, bit 6 or bit 5 (at step S4).

Next, the number determining portion 12 determines whether or not each memory module in the determined stack is allocated a memory area (at step S5). At step S5, if bit 23 is "1", then it is determined that the fifth memory module is allocated a memory area. Similarly, if bit 17 is "1", then it is determined that the sixth memory module is allocated a memory area. In this case because bit 23 is "0" and bit 17 are "1", it is determined that only the sixth memory module is allocated a memory area. In this case, it is determined that the memory module to be accesses is the sixth memory module without using bit 5 of the line address.

As a result, bits (16–12) of the ninth entry are read from BCT 11 as a source address to be converted to a row address.

Next, the process of the address determining portion 14 using the ABPT 13 will be explained.

The second selector 18 validates the determined results of the number determining portion 12 (namely, the card number, the stack number, and the memory module number) corresponding to a read/write select signal (or information stored in the second read/write select signal register 24) representing that the main memory is being accessed, and sends the determined results to the second decoder 19. Here, the read/write select signal is received from the processor 1.

The second decoder 19 decodes the card number, the stack number, and the memory module number determined by the number determining portion 12.

The address determining portion 14 searches the ABPT 13 with a key of the decoded results.

The address determining portion 14 determines an implementation address (both a row address and a column address to be accessed) on the basis of the information representing both the number of bits of the row address and the number of bits of the column address, wherein the information is retrieved from the ABPT 13, the line address which has been received from the processor 1 and stored in the address register 10, and the source address which has been is read from the BCT 11 by the number determining portion 12.

Next, with reference to the flow chart shown in FIG. 9, such an address determining process will be described.

In the following explanation, it is assumed that data "1000" (binary) has been written to an entry of the ABPT 13 corresponding to the sixth memory module (see FIG. 4).

The address determining portion 14 determines which bits of the line address have been used to designate the card number, the stack number, and the memory module number (at step S10).

According to the embodiment of the present invention, since the number of cards is two, which can be represented by one bit; the number of stacks in one stack is two, which can be represented by one bit; and the number of memory modules in one stack is two, which can be represented by one bit), in order to designate a card number, a stack number, and a memory module number, predetermined three bits of the line address are used (as was described above, it is assumed that bits (7–5) are used in this example).

Thereafter, the address determining portion 14 determines the number of bits of the column address on the basis of information in the entry of the ABPT 13 which corresponds to the memory module having the memory module number determined by the number determining portion 12 (at step S11), and determines the column address to be sent to the main memory 3 with the number of bits determined (at step S12).

In this example, since bits (1–0) of the relevant entry of the ABPT 13 (the entry corresponding to the sixth memory module) are "00" (binary), the number of bits of the column address is 8. Thus, bits (15–8) of the line address (bits (15–8) are eight bits just preceded by bits (7–5) as the determined results at step S10) are combined with higher bits of "000" (binary), resulting in a column address which is actually sent to the main memory 3. The notation of "000-A(15–8)" shown in FIG. 9 represents the column address. The reason why the high order three bits are added is the implementation address which is sent to the main memory 3 contains a column address up to 11 bits.

Thereafter, the address determining portion 14 determines a row storage capacity, which is defined as the storage capacity of the storage area allocated to the memory module with respect to the memory area to be accessed with a row address, on the basis of the card number, the stack number, and the memory module number which are determined by the number determining portion 12. The address determining portion 14 also determines which bits of the source address (data of five bits which will be converted to the row address of the memory module (in this example, the sixth memory module)) should be used on the basis of the row storage capacity in order to create a row address (at step S13).

In other words, if the row storage capacity is 32 MB, the two low order bits of the source address are used to create a row address. If the row storage capacity is 64 MB, the three low order bits of the source address are used to create a row address. If the row storage capacity is 128 MB, the four low order bits of the source address are used to create a row address. If the row storage capacity is 256 MB, all the bits of the source address are used to create a real row address.

In this example, since the row storage capacity is 128 MB, the four low order bits of the source address are used.

Thereafter, the address determining portion 14 determines the number of bits of the row address on the basis of the value of bits (3–2) of the relevant entry of the ABPT 13 (at step S14), and determines a row address to be sent to the main memory 3 on the basis of the determined results at steps S13 and S14 (at step S15).

In this example, since bits (3–2) of the relevant entry of the ABPT 13 are "10" (binary), the number of bits of the row address is 12. Thus, bits (23–16) of the line address (bits (23–16) are eight bits just preceded by bits (15–8) used to determine the column address at step S12) are combined with higher four bits which are the same as the lower four bits of the source address. In addition the combined bits are combined with the highest bit of "0", resulting in a row address which is actually sent to the main memory 3. The notation of "0-BCT(3–0)-A(23–16)" shown in FIG. 9 represent the row address. The reason why the high order five bits are added is the implementation address which is sent to the main memory 3 contains a row address up to 13 bits.

Lastly, the implementation address containing both the column address obtained at steps S12 and the row address obtained at steps S15 is stored in one of implementation address buffer group 15 (at step S16). Here, the implementation address also includes a card number, a stack number, and a memory module number sent from the number determining portion 12.

The third selector 28 selects one of implementation addresses stored in the implementation address buffer group 15 on the basis of an output arbitration signal from the main memory output arbitrating portion 29 and supplies the selected implementation address to the main memory 3.

The main memory output arbitrating portion 29 arbitrates an output from the third selector 28 using, for example, a round robin method. Since the round robin method is used, the same bank can be prevented from being intensively accessed. Thus, the main memory can be effectively interleaved.

(2) Modified of Embodiments

The memory access controlling system according to the basic embodiment may be modified as modifications (a) and (b) as follow:

(a) In the basic embodiment, the BCT 11 and the ABPT 13 are initialized under the control of the processor 1. However, after the processor 1 issues a command for initializing the BCT 11 and the ABPT 13 to the system controlling device 2, the system controlling device 2 may initially set the BCT 11 and the ABPT 13.

(b) The output arbitration by the main memory output arbitrating portion 29 may be performed using a method other than the round robin method.

As was described above, according to the present invention, the following effects are obtained.

First, since the processor accesses each unit of the main memory, the main memory can be extended unit by unit and even if there are a plurality of memory modules having different storage capacities, they can be equally interleaved.

This is because the BCT is initialized in consideration of the interleaved hierarchy and when the main memory is accessed, the main memory is interleaved by the process by the number determining portion using the BCT.

Second, even if a plurality of memory modules having different storage capacities have been implemented, an implementation address do not vary at the boundary between an address where a storage region area exists and an address where a storage region area does not exist. In addition, it is prevented that an implementation address indicates a non-used memory area and also, it is prevented that an implementation address indicates a plurality of used memory areas.

This is because each entry of the BCT contains not only source addresses of memory modules but also valid bits each of which represents whether or not a memory device is implemented to each memory module, and when it is indicated that a certain memory module has no memory device, such a memory module is excluded from a process of interleave.

Third, even if the number of memory modules each of which has a memory device is not any of power of 2 (for example, the number of such memory modules is 3, 5, 6, or 7), the main memory can be interleaved regardless of the number of memory modules because the BCT is used for interleave.

Although the present invention has been shown and explained with respect to the best mode of embodiment thereof, it should be understood by those skilled in the art that the foregoing and various other changes, omissions, and additions in the form and detail thereof may be made therein without departing from the spirit and scope of the present invention.

What is claimed is:

1. A memory access controlling system for hierarchically interleaving a memory in a unit of memory module and accessing the memory, comprising:

a bank control table having entries corresponding to memory units, each of said entries containing data for a plurality of the memory modules, said data for each of said memory modules having a presence bit and a source address to be converted to a row address of the memory module concerned, said presence bit representing whether or not a memory device is mounted on the memory module concerned;

an address bit position table containing information which represents both the number of bits of the row address and the number of bits of the column address of a memory device, if any, mounted on each of said memory modules;

a decoder for obtaining the number of the memory unit to be accessed on the basis of a line address which is supplied from an access source;

a number determining portion for determining the memory module to be accessed on the basis of said line address and the presence bit in the data contained in an entry of said bank control table having the number obtained by said decoder; and an address determining portion for searching said address bit position table for information that represents both the number of bits of the row address and the number of bits of the column address of the memory device mounted on the memory module determined by said number determining portion, and in addition determining both the row address and the column address of the memory module to be accessed on the basis of said line address, a source address to be converted to the row address of the memory module to be accessed, said source address being included in data contained in the entry having the number obtained by said decoder, and the searched information representing both the number of bits of the row address and the number of bits of the column address;

a buffer group for storing a plurality of implementation addresses, each of which is composed of the number of the memory module determined by said number determining portion and the row address and column address determined by said address determining portion; and an arbitrator for arbitrating the plurality of implementation addresses stored in said buffer group.

2. The memory access controlling system as set forth in claim 1, wherein an equal storage capacity is allocated to each of the memory units.

3. The memory access controlling system as set forth in claim 1,
wherein the storage capacity of each of the memory units is the same as the storage capacity of a memory module having the smallest storage capacity.

4. The memory access controlling system as set forth in claim 1,
wherein the hierarchy of the memory modules has a two-branch tree structure.

5. The memory access controlling system as set forth in claim 1,
wherein an equal storage capacity is allocated to gatherings in the same hierarchical level for each of said memory unit.

6. A memory access controlling system for hierarchically interleaving a memory in a unit of memory module and accessing the memory, comprising:
a bank control table having entries corresponding to memory units, each of said entries containing data for a plurality of the memory modules, said data for each of said memory modules having a presence bit and a source address to be converted to a row address of the memory module concerned, said presence bit representing whether or not a memory device is mounted on the memory module concerned;

an address bit position table containing information which represents both the number of bits of the row address and the number of bits of the column address of a memory device, if any, mounted on each of said memory modules;

a decoder for obtaining the number of the memory unit to be accessed on the basis of a line address which is supplied from an access source;

a number determining portion for determining the memory module to be accessed on the basis of said line address and the presence bit in the data contained in an entry of said bank control table having the number obtained by said decoder; and an address determining portion for searching said address bit position table for information that represents both the number of bits of the row address and the number of bits of the column address of the memory device mounted on the memory module determined by said number determining portion, and in addition determining both the row address and the column address of the memory module to be accessed on the basis of said line address, a source address to be converted to the row address of the memory module to be accessed, said source address being included in data contained in the entry having the number obtained by said decoder, and the searched information representing both the number of bits of the row address and the number of bits of the column address; and connections to a main memory comprised of X memory card slots hosting a possible total of M memory modules, any one of the memory modules having no more the N memory units, and wherein,
the bank control table comprises a table of N rows and M columns for a total of N*M locations,
each of the M columns corresponds to one of the possible memory modules,
the locations corresponding to unmounted memory modules are empty of said data, and
the locations corresponding to mounted memory modules contain said data only to the extent that each mounted memory module has memory units, whereby mounted memory modules having less than N memory units have empty entries as well as filled entries.

7. The memory access controlling system as set forth in claim 6, wherein an equal storage capacity is allocated to each of the memory units.

8. The memory access controlling system as set forth in claim 6,
wherein the storage capacity of each of the memory units is the same as the storage capacity of a memory module having the smallest storage capacity.

9. The memory access controlling system as set forth in claim 6,
wherein the hierarchy of the memory modules has a two-branch tree structure.

10. The memory access controlling system as set forth in claim 6,
wherein an equal storage capacity is allocated to gatherings in the same hierarchical level for each of said memory unit.

11. A memory access controlling device for interleaving between memory device units of unequal storage capacity when a processor accesses a main memory, comprising:
a connection to the processor;
a connection to the main memory, the main memory being divided into plural memory card banks, the banks being comprised of memory stacks, the memory stacks being comprised of memory modules, the memory modules being comprised of memory device units, each memory device unit having a storage capacity;
an address register (10), the address register configured to temporarily store a physical line address received from the processor;
a bank control table (11), the bank control table comprising entries for plural memory device units, each entry containing a valid bit indicating the implementation of memory device units, and a source address for each implemented memory device unit, the source address to be converted to a row address of storage area of a corresponding memory module;

a number determining portion (12) connected to the address register and to the bank control table, the number determining portion responding to a main memory access by making an access determination concerning a card bank number, a stack number, and a memory module number to be accessed corresponding to the line address received from the processor and information stored in the bank control table;

an address bit position table (13) operatively connected to the number determining portion, the address bit position table having entries for individual memory modules of the main memory, the entries indicating the number of bits of the row address and the number of bits of the column address for each memory module;

an address determining portion (14) connected to the address register, the number determining portion and the address bit position table, the address determining portion responding to the main memory access by searching the address bit position table based on the access determination of the number determining portion and making an implementation address determination based on the number of bits of the row address and the number of bits of the column address obtained from the address bit position table, the line address sent from the processor, and a source address read from the bank control table, the source address read from the bank control table being converted to a row address, the implementation address determination comprising the row address and the column address necessary to address the main memory; and an implementation address buffer group (15) connected to the number determining portion and the address determining portion, the implementation address buffer group comprised of plural implementation address buffers storing an implementation address comprising a memory card number, a memory card stack number, a memory module number, and both a row address and a column address of a corresponding memory module, wherein, the device is configured to operate with a main memory having memory device units of unequal storage capacities, and the main memory has an interleaved hierarchy comprising of memory bank, memory stack, and memory module in this order.

12. The memory access controlling device of claim 11, further comprising:

a first selector (16) connected to a first decoder (17), the first decoder connected to the bank control table;

a second selector (18) connected to a second decoder (19), the second selector connected to the number determining portion, the address bit position table (13) connected to the second decoder;

a first read/write select signal register (20) connected to the first selector;

a first write address register (21) connected to the first selector;

a first write enable register (22) connected to the bank control table;

a first write data register (23) connected to the bank control table;

a second read/write select signal register (24) connected to the second selector;

a second write address register (25) connected to the second selector;

a second write enable register (26) connected to the address bit position table; and a second write data register (27) connected to the address bit position table, wherein, a read/write select signal is a signal representing whether the memory access controlling device is being accessed or initialized, the first selector validates, when an initialization is performed, a write address sent from the processor and, when the main memory is accessed, a line address sent from the processor, and upon validation, outputs a validated address to the bank control table via the first decoder, the second selector validates, when an initialization is performed, a write address sent from the processor via the second write address register and sends the validated write address to the address bit position table via the second selector, and, when the main memory is accessed, sends the access determination from the number determining portion to the address bit position table via the second decoder.

13. The memory accessing controlling device of claim 12, further comprising:

a third selector connected to the implementation address buffer group and having a connection to the main memory; and a main memory output arbitrating portion (29) connected to the third selector, wherein, the third selector selects a particular implementation address to be sent from the implementation address buffer group to the main memory, and the main memory output arbitrating portion creates a selection condition for the third selector.

14. The memory accessing controlling device of claim 11, wherein, the entries of the bank control table comprises 6 bits, one valid bit and 5 bits expressing the source address, one record of the bank control table comprises a number of entries equal to a number of memory modules capable of being implemented in the main memory, and a number of records in the bank control table equals a maximum number of memory device units in any one memory module.

15. The memory accessing controlling device of claim 14, wherein, the entries of the bank control table corresponding to an unmounted memory modules are empty, and the entries of the bank control table corresponding to mounted memory modules are filled only to the extent that each mounted memory module has implemented memory device units, whereby mounted memory modules having implemented memory device units less than the maximum number of memory device units, have empty entries as well as filled entries.

* * * * *